United States Patent
Iwasaki

(10) Patent No.: US 6,853,499 B2
(45) Date of Patent: Feb. 8, 2005

(54) LENS BARREL AND CAMERA

(75) Inventor: Tetsuya Iwasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/687,628

(22) Filed: Oct. 20, 2003

(65) Prior Publication Data

US 2004/0130803 A1 Jul. 8, 2004

(30) Foreign Application Priority Data

Oct. 21, 2002 (JP) .......................................... 2002-306288

(51) Int. Cl.[7] .............................. G02B 15/14; G02B 7/02
(52) U.S. Cl. ........................ 359/694; 359/699; 359/700; 359/819; 359/826
(58) Field of Search ................................. 359/694, 699, 359/700, 701, 703, 819, 821, 822, 826, 704

(56) References Cited

U.S. PATENT DOCUMENTS 5,392,100 A * 2/1995 Yoshida ....................... 399/211
5,969,878 A * 10/1999 Koizumi ...................... 359/682
6,195,212 B1 * 2/2001 Miyamoto ................... 359/699

FOREIGN PATENT DOCUMENTS

JP  2002-162552  6/2002

* cited by examiner

*Primary Examiner*—Timothy Thompson
(74) *Attorney, Agent, or Firm*—Oblon, Spivak, McClelland, Maier & Neustadt, P.C.

(57) ABSTRACT

A cam cylinder is provided with a first group cam and a second group cam, respectively. A first group lens system and a second group lens system are engaged through a first group driving pin and a second group driving pin with the first and second group cams, respectively. The first and second group lens systems are biased by a spring and are placed under a biased force acting in the opposite directions along an optical axis. The first and second group cams have large cam angles in the vicinity of a starting position for collapsing in which a spring force is small, and the cam angles are reduced continuously in response to an increment of the spring force, and the cam angles become minimum in the vicinity of a collapsed position in which the spring force is maximum.

12 Claims, 6 Drawing Sheets

LENS BARREL AND CAMERA

BACKGROUND OF THE INVENTION

1. Field of the Invention

The present invention relates to a lens barrel suitable for use in a small camera such as a digital camera or the like and a camera using the lens barrel, particularly, to an improvement in a cam shape to move lenses in a collapsible lens barrel.

2. Description of the Prior Art

In recent, a miniaturization of a lens barrel has been advanced rapidly in response to a downsize of a camera, especially, a digital camera. The digital camera is adapted to image a subject by a solid-state image sensing device, such as a CCD (charge-coupled device), obtain image data of a still image or moving image of the subject and then to store digitally in an electronic recording medium. The digital camera, also, can be miniaturized easily, because a taking lens becomes small, if a small solid-state image sensing device is used.

By the way, because a current consumption in such a digital camera is large in structure, a used possible time tends to be short and therefore saving of current consumption is requested. In particular, a load becomes large in driving the lens barrel and therefore there is raised a problem that the current consumption becomes large.

As a small lens barrel, there is used a structure of one and two step collapsible lens barrels and so on, which are collapsed by a cam when photographing. In the structure, the rotation of a cam follower engaging with a cam on a cam cylinder is limited by a groove for direct advance to go straight a lens group and then the lens group combined with the cam follower is forwardly and backwardly moved by the rotation of the cam cylinder. There is, also, well known a collapsible lens barrel of one step type.

The one step type collapsible lens barrel comprises a fixing cylinder which is fixed to a substrate and which has a direct advance groove for carrying out a rotating limitation, a cam cylinder which is rotatably arranged peripherally of the fixing cylinder and which has a cam groove, and a lens frame which has a cam follower engaging with the cam groove and direct advance groove and which holds the lens group. By the rotation of the cam cylinder, the lens group is moved into a any position along direct advance groove.

The two step type collapsible lens barrel is composed of a fixing cylinder which is fixed to a substrate and which has a cam groove, a rotating cylinder having a cam follower engaging with the cam groove of the fixing cylinder, a direct advance cylinder which is disposed within the rotating cylinder so as to move forwardly and backwardly while the rotation being limited together with the rotating cylinder and which has a direct advance groove, lens frames which each have cam followers engaging with the cam groove of the rotating cylinder and the direct advance groove of the direct advance cylinder and which hold the lens groups. An inner surface of the rotating cylinder is formed with a cam groove for moving the lens frames.

By the rotation of the rotating cylinder, the direct advance cylinder is moved forwardly and backwardly along the cam groove of the fixing cylinder while rotating and then the lens frames engaging with the cam groove of the rotating cylinder are moved into any positions in forward and backward directions, with the rotation being limited by the direct advance groove of the direct advance cylinder.

In the lens barrel, the lens groups must be driven accurately in character and a space between the cam groove and cam follower must be substantially 0 (zero). However, working the cam groove in such a manner that the space becomes zero is difficult, an evenness of a torque necessary to rotate the rotating cylinder is generated by variation in a width of the cam groove. In order to resolve this problem, a play is provided between the cam groove and cam follower and a high accurate cam surface having a high shape accuracy is formed on one of the opposite walls of the cam groove and then the cam follower is contacted under a pressure with and moved sidably on the high accurate cam surface by biasing the cam follower with a resilient member such as a spring or the like. With the construction, it is possible to hold an accurate lens positional relationship.

In other words, the lens frames are biased always in a reverse direction by disposing a spring between the lens frames, or the rotating cylinder is biased always forwardly by disposing a pressure spring between the rotating cylinder and substrate in the two step type collapsible lens barrel, thus to carry out accurately the movement of the lens groups along the cam shape.

The collapse in the collapsible lens barrel can be carried out in such a manner that the lens groups are approached as soon as possible, as in a coaxial telescopic cylinder in order to miniaturize the whole in case of non-photographing.

Conventionally, the cam for moving the lens groups has usually a straight line having a constant angle to an imaged plane in a collapsed region from a photographing state to a collapsed state to carry out the collapse of the lens groups and rotating cylinder. If an amount of movement of the lens groups is large between the collapsed state and photographing state, it is necessary to take a large cam angle and therefore a very large energy is required for a collapsed operation. Further, the lens groups are approached in the collapsed state and the spring for biasing must be contracted, accordingly.

A large energy is required to contract the spring, and a necessary energy becomes large in proportion to the contracted amount of the spring as approaching to the lens groups. The combined energy is required to impart to a rotating torque of the cam and becomes the maximum just before completion of collapse.

Usually, it is considered that a DC (direct current) motor or stepping motor is used as a driving source for imparting a rotational torque. In case of the DC motor, there is a problem that a current value becomes large in order to generate a large torque. In the stepping motor, it is necessary to select a large motor or use a small resistance. As the resistance is lowered in the stepping motor, of course, there is a problem that the current value is elevated.

In order to resolve these problems, there is known a conventional lens barrel attempting to minimize an energy necessary to collapse with a less friction by widening a width of the cam in collapsed region than that as in the photographing region to form a play between the cam and cam follower, as disclosed in Japanese Patent Laid-Open No. 2002-162552.

However, the structure disclosed in Japanese Patent Laid-Open No. 2002-162552 is not effective to a lens barrel desiring to maintain accurately a position of lens groups by bias of a spring.

In a lens barrel in which a load is added to close a barrier when lens groups are collapsed, a combined energy is eliminated by minimizing an angle of a cam in a loaded portion and thus by minimizing an energy by the angle of the cam.

However, in the lens barrel, energy on a portion closing the barrier is merely eliminated, in a collapsed region just before the barrier is closed, a great energy is required in order to have the large angle of the cam and therefore it is not make any difference from the conventional lens barrels, as described above.

SUMMARY OF THE INVENTION

It is an object of the present invention to provide a lens barrel capable of restricting effectively an increment of a rotational torque in a collapsed region shifting from a photographing state to a collapsed state and of a predetermined operation energy according to a collapsed operation of lens groups.

To achieve the above object, a lens barrel according to the present invention comprises a plurality of lens groups, a cam cylinder having a cam to move at least a portion of said plurality of lens groups toward positions corresponding to a predetermined photographing state and a collapsible state along an optical axis, a cam follower to move the portion of lens groups by engaging with the cam and rotating relatively to the cam cylinder along the cam, and an elastomer for biasing the cam follower along the optical axis to slide the cam follower on the cam, a biased force of said elastomer varying in response to a moved position of the cam follower.

The cam has a configuration having different angles to an imaged plane at a plurality of positions in a collapsible region which includes a collapsed position at which the cam follower is in a collapsed state.

DETAILED DESVRIPTION OF THE PREFERRED EMBODIMENTS

Several embodiments of a lens barrel and a camera according to the present invention will be explained with reference to the accompanying drawings below.

Figure 1:
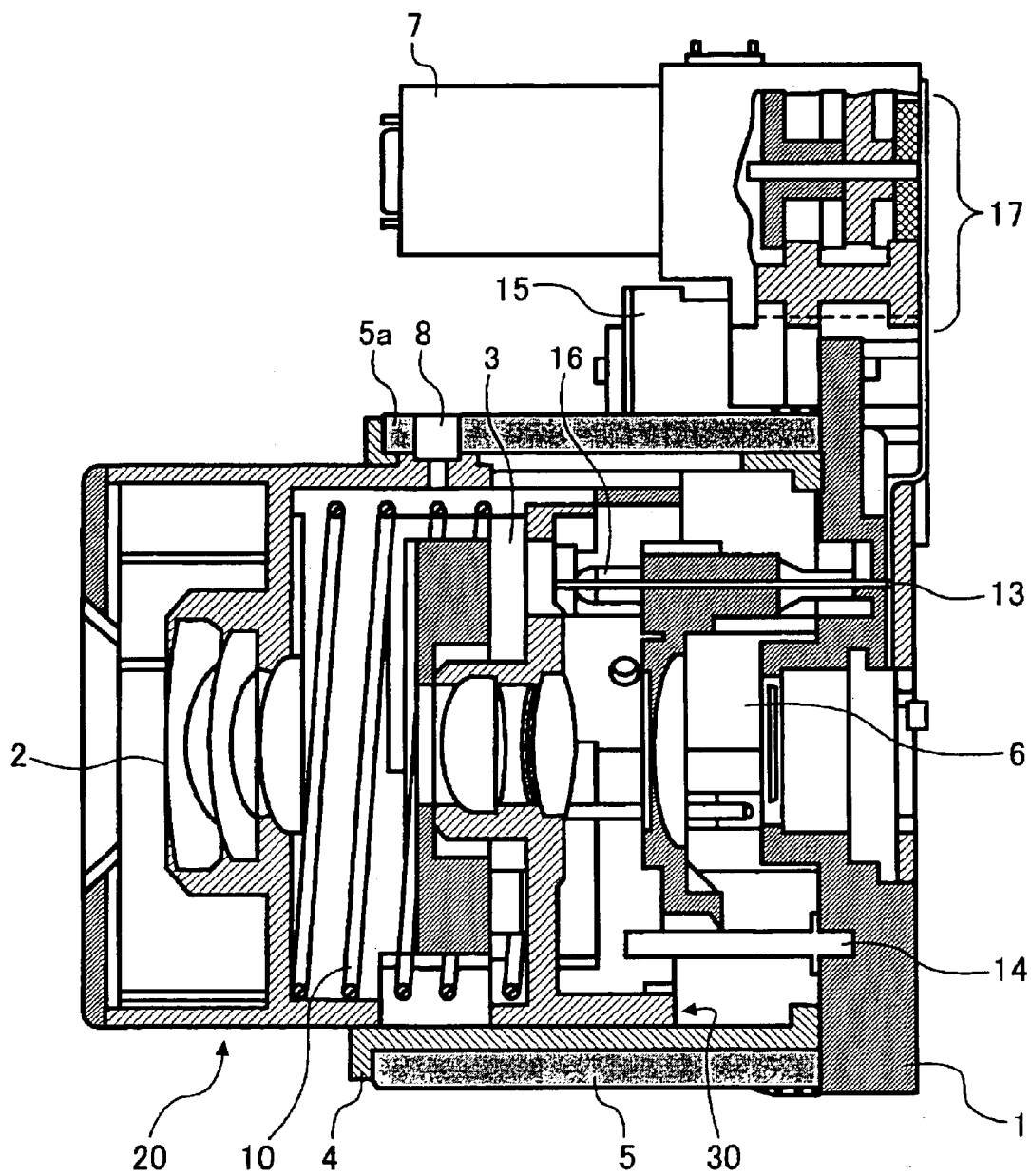
FIG. 1 is a partial longitudinal sectional front view of a photographing optical system taken along an optical axis in a photographing state of a camera on which a lens barrel according to one embodiment of the present invention is mounted.
Figure 2:
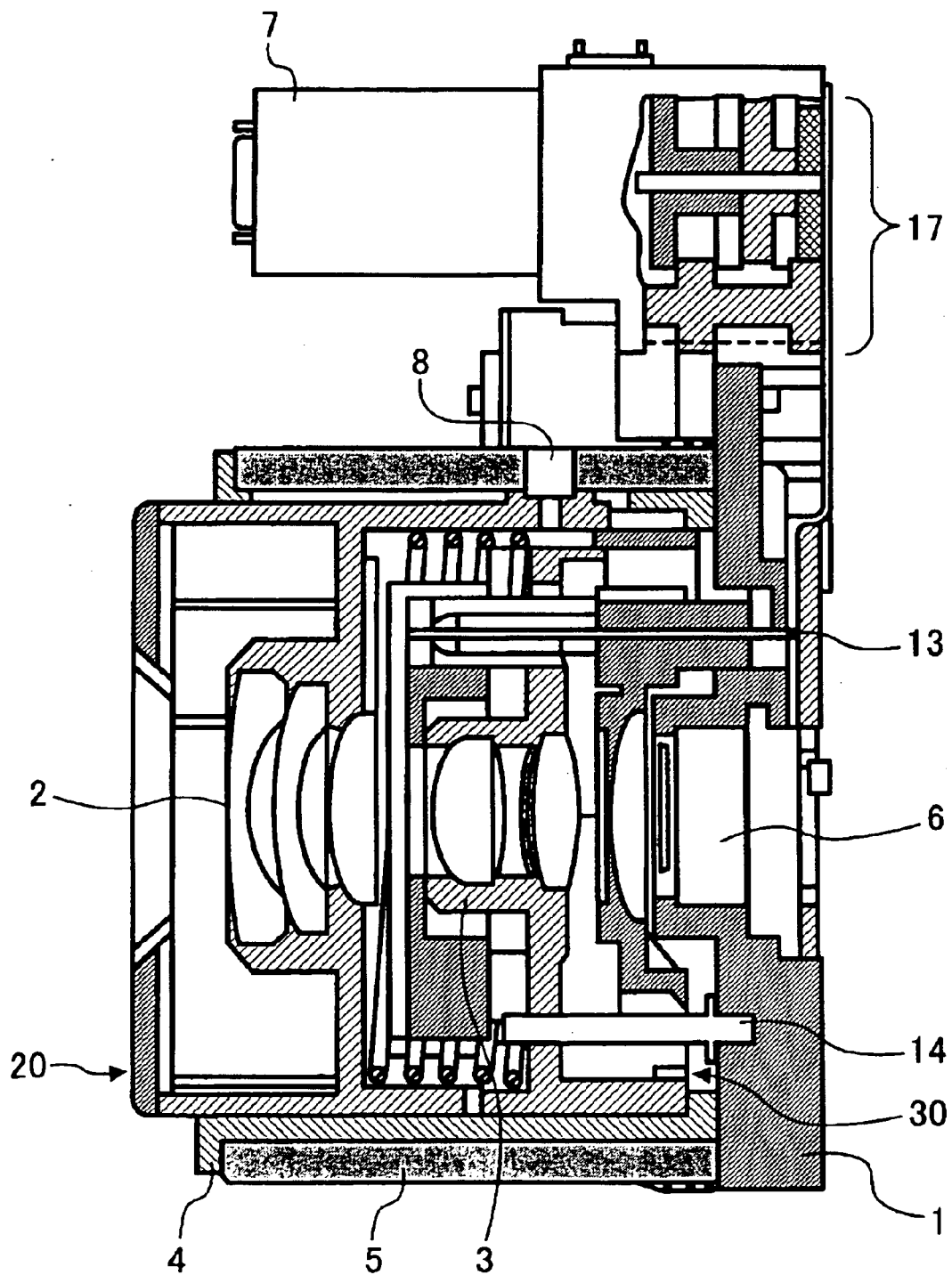
FIG. 2 is a partial longitudinal sectional front view of the photographing optical system of the camera shown in FIG. 1, taken along the optical axis, in which the photographing optical system is in a collapsed state.
Figure 3:
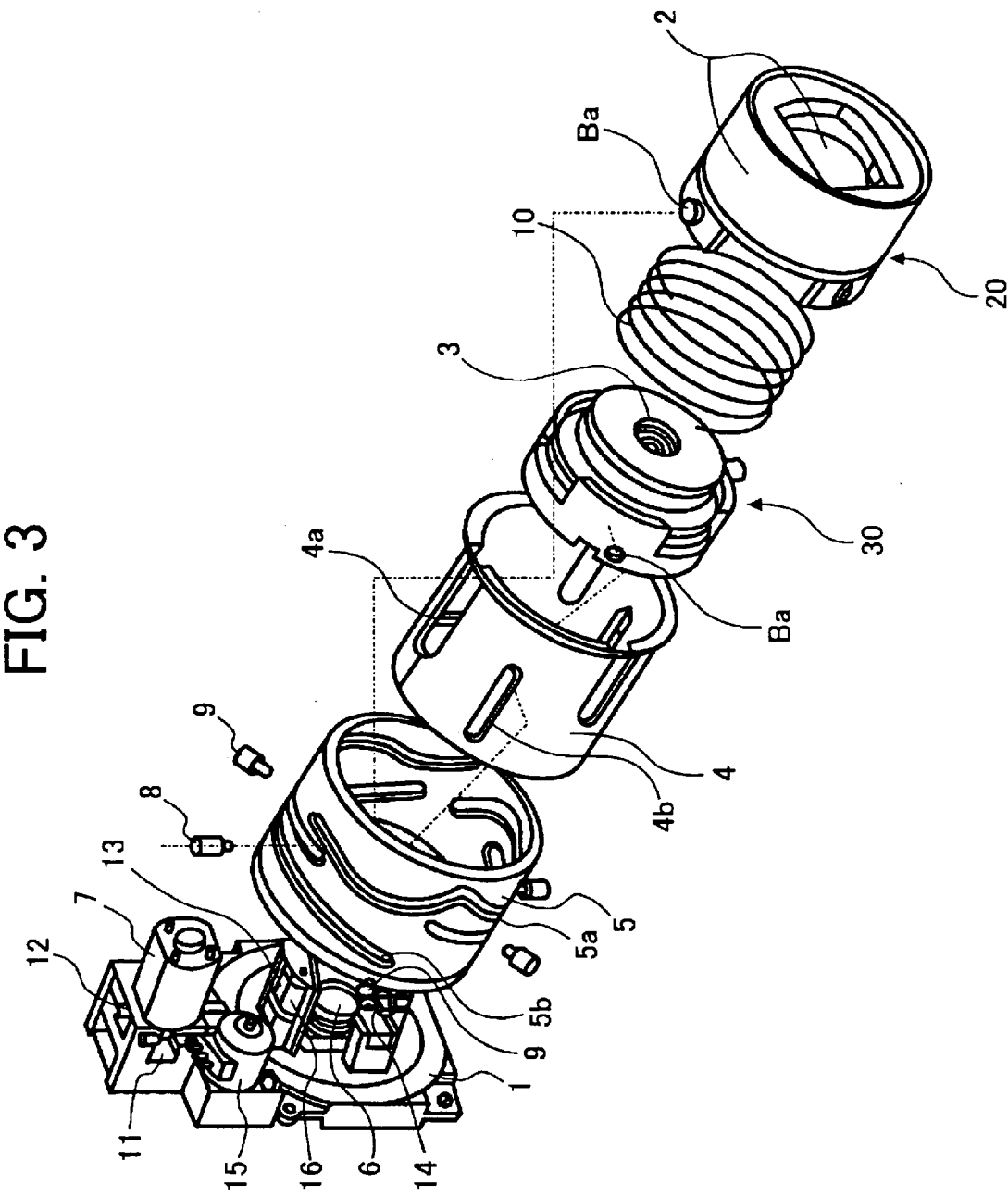
FIG. 3 is an exploded perspective view showing schematically a detailed structure of the lens barrel constituting the photographing optical system of the camera in FIG. 1.

FIGS. 1 to 3 show a structure of the camera in which the lens barrel in one embodiment of the present invention is assembled. The camera shown in FIGS. 1 to 3 comprises a base 1, a first moving cylinder 20 including a first group lens system 2, a second moving cylinder 30 including a second group lens system 3, a fixing cylinder 4, a cam cylinder 5, a third group lens system 6, a DC (direct current) motor 7, a first group driving pin 8 or first cam follower, a second group driving pin 9 or second cam follower, a spring 10, an encoder plate 11, a photo-interrupter 12, a main shaft 13, a sub shaft 14, a stepping motor 15, a lead screw 16 and a reduction gear array 17.

The lens barrel in the embodiment of this invention comprises the first and second group lens systems 2 and 3 for carrying out a variable power, the third group lens system 6 for focusing, the fixing cylinder 4 fixed to the base 1 as a substrate, the cam cylinder 5 fitted rotatably on an outer periphery of the fixing cylinder 4 and so on. The first group lens system 2 is attached to collapse or retract in the fixing cylinder 4 as shown in FIG. 2, and to extend forwardly from the fixing cylinder 4 as shown in FIG. 1. The first moving cylinder 20 of the second group lens system 3 and the second moving cylinder 30 of the third group lens system 6 are disposed movably in the fixing cylinder 4 along the direction of optical axis or forward and backward directions. The cam cylinder 5 is rotated through the reduction gear array 17 by the DC motor 7.

The cam cylinder 5 is provided with at least one cam or cam groove for positioning a portion of the plurality of lens groups. In the embodiment, the cam cylinder 5 is provided with a first group cam or first cam groove 5a formed for determining a position of the first group lens system 2 and a second group cam or second cam groove 5b formed for determining a position of the second group lens system 3, respectively.

The first group driving pin or first cam follower 8 of the first group lens system 2 and second group driving pin or second cam follower 9 of the second group lens system 3 are engaged with the first and second group cam grooves 5a and 5b of the cam cylinder 5, respectively.

The fixing cylinder 4 is provided with first and second linear guide grooves 4a and 4b extending along the optical direction. A boss Ba of the first moving cylinder 20 in which first group lens system 2 is provided is engaged movably into the first guide groove 4a to move linearly the first group lens system 2 along the optical axis. A boss Bb of the second moving cylinder 30 having the second group lens system 3 is engaged movably into the second guide groove 4b to move linearly the second group lens system 3 along the optical axis.

The first group driving pin 8 is attached to the boss Ba of the first group lens system 2 and the second group driving pin 9 is attached to the boss Bb of the second group lens system 3. The first moving cylinder 20 of the first group lens system 2 and the second moving cylinder 30 of the second group lens system 3 are biased in a mutually separated direction along the optical direction by means of the spring 10. By this biasing, the first group driving pin 8 of the first group lens system 2 is contacted under a pressure with a sliding surface 5as (see FIG. 4) of the first group cam 5a and the second group driving pin 9 of the second group lens system 3 is contacted under a pressure with a sliding surface 5bs of the second group cam 5b.

In this embodiment, the bosses Ba and Bb of the first and second moving cylinders 20 and 30 are engaged in the first and second guide grooves 4a and 4b, but, the first and second group driving pins 8 and 9 may be engaged directly in the first and second guide grooves 4a and 4b.

When the cam cylinder 5 is rotated, first moving cylinder 20 of the first group lens system 2 and second moving cylinder 30 of the second group lens system 3 are moved linearly along the optical axis without rotating, while holding a desired positional relationship by means of the sliding surfaces 5as and 5bs of first and second group cams 5a and 5b in the cam cylinder 5 to carry out the variable power operation.

The encoder plate 11 has a plurality of slit holes and id rotated in association with one portion of the gear array 17. A light from the photo-interrupter 12 is shielded intermittently by means of rotation of the encoded plate 11 and thus a pulse is outputted from a light receiving part of the photo-interrupter 12. It is possible to detect a number of rotation of the DC motor 7 or an amount of rotation of the cam cylinder 5, thereby, detecting accurately the variable power position, such as a zoom position and so on. In addition, the zoom position may be detected by use of a stepping motor instead of the DC motor 7 and of a pulse number for giving to the stepping motor.

The third group lens system 6 is supported by the main and sub shafts 13 and 14 extending along the optical axis and is moveable along the main and sub shafts 13 and 14. The third group lens system 6 is, by the rotation of the stepping motor 15, moved accurately through a reduction gear array (not shown) by the rotated lead screw 16 along the optical axis to carry out a focus operation.

The lens barrel or zoom lens barrel is miniaturized by all the lens groups being disposed closely to the image side in a region failing to interrupt and by the first moving cylinder 20 of the first group lens system 2 being collapsed, when a power of the camera is turned off, as shown in FIG. 2.

Figure 4:
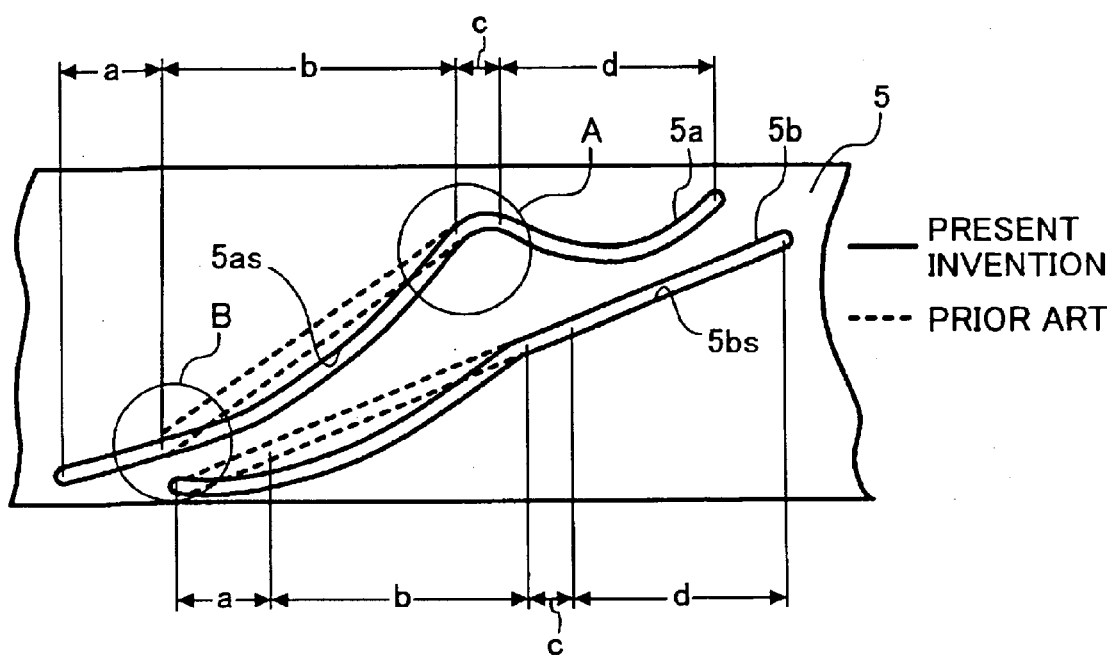
FIG. 4 is a developed view of a cam showing a cam shape in a cam cylinder of the lens barrel in FIG. 3 and a conventional cam shape.
Figure 5:
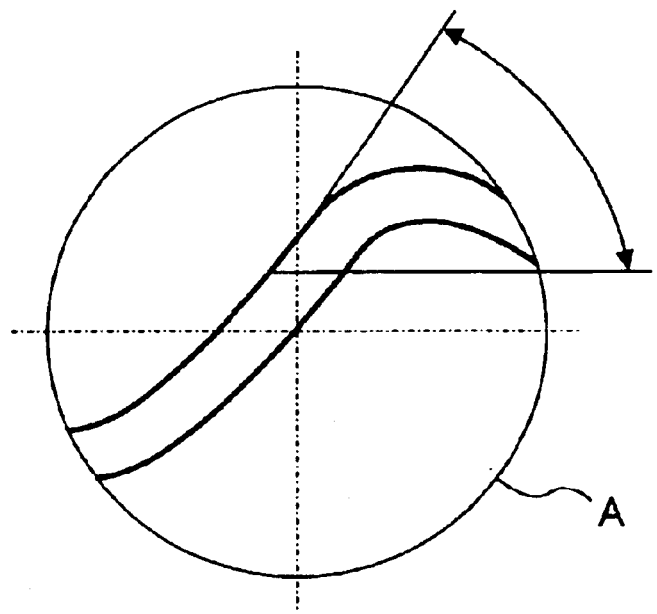
FIG. 5 is a partial enlarged view enlarging the portion A in the developed view of the cam in FIG. 4.

FIG. 4 illustrates a view showing one portion of a cam shape or cam groove shape provided on the cam cylinder 5. As shown in FIG. 4, the cam shape or a shape of each of the cam grooves has a barrier closing region a, a retracted or collapsed region b, a photographing stand-by region c and a photographing region d. In addition, a solid line shows the cam shape in the embodiment of the present invention and a broken line shows a cam shape in the prior art.

As shown by the broken line in FIG. 4, the prior art cam shape is formed into a straight line which is inclined to the imaged plane at a constant angle, in the collapsed region b. As noted from FIG. 4, the first and second group lens systems 2 and 3 are spaced in the vicinity of a starting position for collapsing (right end of the collapsed region b), while, are disposed to approach in the barrier closing region a. As described above, the spring 10 is provided between the first moving cylinder 20 of the first group lens system 2 and second moving cylinder 30 of the second group lens system 3 to separate the first and second moving cylinders 20 and 30 with respect to each other. Consequently, when the first and second moving cylinders are approached, a reacted force of the spring 10 is increased and therefore the cam followers 8 and 9, namely, first and second group driving pins contact with and slide on the sliding surfaces 5as and 5bs of the first and second group cams 5a and 5b, respectively, under a very strong force in the vicinity of the collapsed position (left end of the collapsed region b).

As a biasing force on the first and second group driving pins 8 and 9 increases, a torque required for rotation of the cam cylinder 5 is increased. Further, when angles of the cam grooves are increased to the imaged plane, a torque of the cam cylinder 5 required for movement of the lens groups toward the imaged plane is increased.

Figure 7:
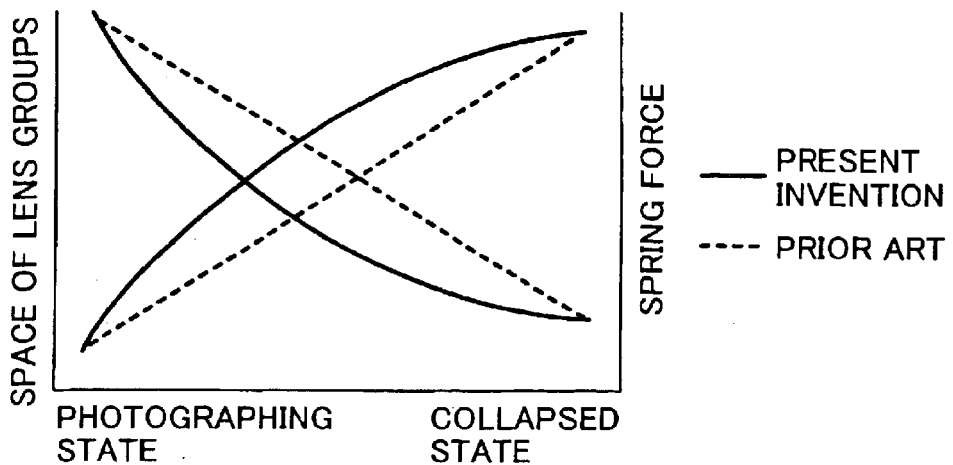
FIG. 7 is a view showing a relationship of a space of lens groups, a force of a spring or elastomer and a state of movement of the lens groups.
Figure 8:
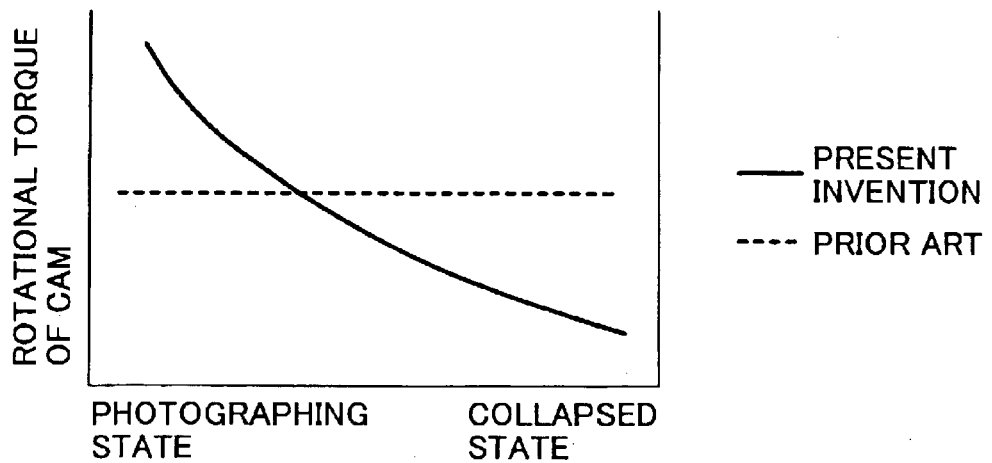
FIG. 8 is a view showing a relationship between a rotational torque in a case of assuming that a spring load is not existed in the lens barrel in FIG. 3 and in a conventional lens barrel and a moved state of the lens groups.
Figure 9:
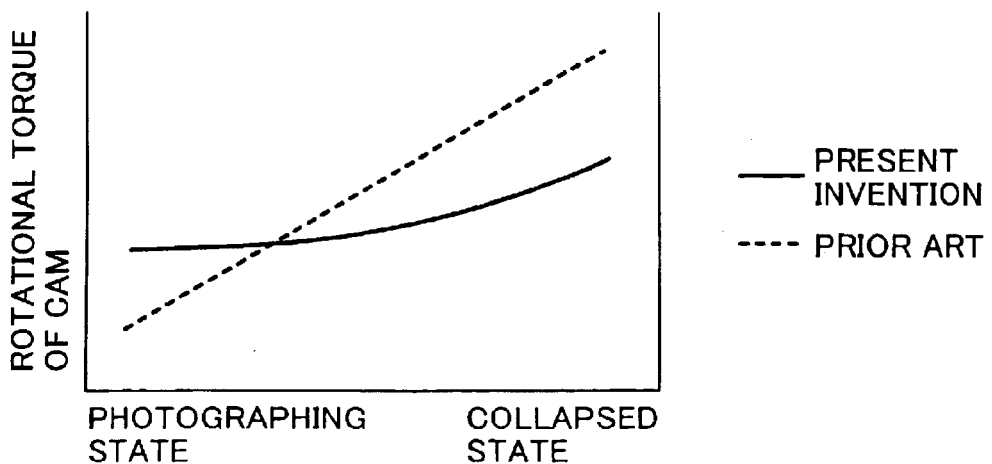
FIG. 9 is a view showing a relationship between a rotational torque in a case that a spring load is existed in the lens barrel in FIG. 3 and in a conventional lens barrel and the moved state of the lens groups.

FIGS. 7, 8 and 9 show a relationship between a spring force and a space of the lens groups from the photographing state to collapsed state, a torque of the cam cylinder 5 in case having no loading of the spring and a torque of the cam cylinder 5 under a loading of the spring. In FIGS. 7, 8 and 9, a solid line shows a case of the present invention and a broken line shows a case of the prior art.

FIG. 7 shows the spring force being increased in inverse proportion to the space of the lens groups, in which because the angles of the cam grooves are constant in the prior art, the space of the lens group becomes small leaner-functionally as shown by the broken line and the spring force becomes large leaner-functionally as shown by the broken line.

As described above, FIG. 8 shows a change of the torque of the cam cylinder 5 by the angles of the cam grooves in a case that the spring load is entirely not provided. In the prior art, because the angles of the cam grooves are constant, the torque is not changed as shown in the broken line.

FIG. 9 shows the torque of the cam cylinder 5 in a case that the spring load is added. The torque is a combination of the spring force and the torque of the cam cylinder 5 according to the angle of the cam. In the prior art, the torque of the cam cylinder 5 is increased linear functionally as shown in the broken line.

Figure 6:
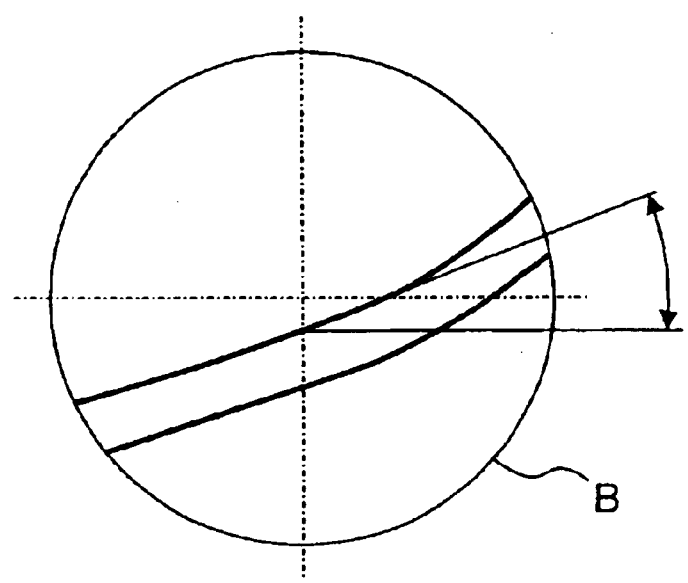
FIG. 6 is a partial enlarged view enlarging the portion B in the developed view of the cam in FIG. 4.

In the embodiment, the angles of the cam grooves as shown in the solid line is set to become large than that as shown in a chained line in the starting position for collapsing (right end of the collapsed region b) in the collapsed region b in order to avoid the increment of the torque of the cam cylinder 5 in the vicinity of a collapsing completed position (left end of the collapsed region b) at which the spring force is small and on the other hand the angles of the cam grooves are set to reduce continuously in response to the spring force increasing as going to the collapsing completed position, as shown in the solid line and then to become minimum in the vicinity of the collapsing completed position at which the spring force becomes maximum, as shown in FIGS. 4 and 6.

In the other words, the angles of the cam grooves showing in the solid line are set in a considerable small value, comparing to that showing in the chained line.

In the embodiment, in order to increase the angles of the cam grooves just after the start for collapsing, the torque of the cam cylinder 5 on which a load is imparted becomes large than that in the prior art, while, it becomes small than that in the prior art in the vicinity of the collapsing completed position because the angles of the cam grooves become small. As a result, it is possible to restrict the maximum value of the torque of the cam cylinder 5 in all the collapsed region b, comparing with that in the prior art.

In the embodiment, the DC motor 7 is used as a power source for rotating the cam cylinder 5. When a generated torque becomes large as a characteristic of the DC motor 7, a current value is increased, accordingly, as a result, if a battery is used as a power source in a camera, the buttery life becomes short due to the increment of a power consumption of the camera. However, if the maximum running torque is small, the power consumption of the camera is reduced since the current value becomes less by just that much and therefore the buttery life can be extended.

As described above, it is possible to low a torque necessary to an operation of collapsing and provide a lens barrel having a low current consumption by varying the angles of the cam grooves in the collapsed region b, in other words, the angles of the sliding surfaces 5as and 5bs of the cam grooves 5a and 5b relative to an imaged plane in response to various positions.

In the aforementioned embodiment, although the sliding surfaces 5as and 5bs are curved because the angles of the sliding surfaces 5as and 5bs to the imaged plane are varied continuously, the sliding surfaces 5as and 5bs may be formed by a plurality of planes for varying gradually the angles thereof.

Features of the present invention typified in the above embodiment and further developed based the embodiment will be arranged and summarized as follows.

As described above, the lens barrel according to the present invention comprises the plurality of lens groups and the cam cylinder 5 having the cam, namely, the cam grooves 5a and 5b to move at least lens groups 2 and 3 of the plurality of lens groups toward the positions corresponding to the predetermined photographing state and the collapsed state along the optical axis.

The cam followers 8 and 9 engage with the cam grooves 5a and 5b to rotate relatively along the cam grooves 5a and 5b and to move the lens groups 2 and 3.

The spring 10 biases the cam followers 8 and 9 along the optical axis to slide the cam followers 8 and 9 in the cam grooves 5a and 5b. The biased force of the spring 10 varies in response to the moved position of the cam followers 8 and 9.

The cam grooves 5a and 5b has the sliding surfaces 5as and 5bs. The sliding surfaces 5as and 5bs have different angles to the imaged plane at a plurality of positions in the collapsed region which includes the collapsed position at which the cam follower is in the collapsed state.

With the above structure, it is possible to prevent or restrict an energy necessary to an operation for collapsing from increasing as collapsing.

In one embodiment, the sliding surfaces 5as and 5bs in the cam grooves 5a and 5b can be formed from a configuration in which the plurality of surfaces having the different angles to the imaged plane are connected sequentially at the plurality of positions in the collapsed region.

In the other embodiment, the sliding surfaces 5as and 5bs may be formed into the curved surfaces in which the angles to the imaged plane are varied continuously in the collapsed region. In this way, it is possible to avoid a problem such as a cratching or the like occurred by a rapid variation in loading in the lens barrel, and thus to expect a more smooth operation in the lens barrel.

In the lens barrel using the spring 10, it is possible to bias the cam followers with a low cost and a stable force and therefore there is an advantageous effect that energy necessary to the collapsed operation can be gripped because the energy of the spring 10 can be predicted easily.

By disposing the spring 10 between the two lens groups 2 and 3 of the plurality of lens groups, if the lens barrel is constituted in a such a manner that the two lens groups are biased in a direction opposite to each other, it is possible to accomplish accurately a suitable positional relationship of the two lens groups and a restriction of the energy necessary to the collapsed operation, with a low cost and a easy structure.

If such a structure is applied to, especially, in a case that the plurality of lens groups are constituted only by the lens groups 2 and 3, all the lens barrel is simplified easily in construction and the suitable positional relationship of the lens groups 2 and 3 and restriction of the energy necessary to the collapsed operation can be accomplished.

The plurality of lens groups have the first and second lens groups 2 and 3. The cams have the first and second cam grooves 5a and 5b. The cam followers have the first cam follower 8 engaging with the first cam groove 5a and the second cam follower 9 engaging with the second cam groove 5b. The fixing cylinder 4 holds rotatably the cam cylinder 5. The fixing cylinder 4 has first and second guide grooves 4a and 4b which extend along the optical axis to engage with the first and second cam followers 8 and 9. The first cam follower 8 and first lens group 2 are held in the first moving cylinder 20. The first moving cylinder 20 is disposed in the fixing cylinder 4 and is movable along the optical axis. The second moving cylinder 30 holds the second cam follower 9 and second lens group 3 and is disposed within the fixing cylinder 4, and is, also, movable along the optical axis. The spring 10 is disposed between the first and second moving cylinders 20 and 30 to bias them in the opposite directions with respect to each other. When the cam cylinder 5 is rotated relatively to the fixing cylinder 4, the first and second moving cylinders 20 and 30 are moved along the optical axis.

As a result, the first and second moving cylinders 20 and 30 are moved accurately into the moved positions. It is, therefore, possible to obtain accurately the positional relationship of the lens groups obtained multiply with a low cost and a easy construction and to restrict effectively the energy necessary to the collapsed operation.

In addition, if the sliding surfaces are formed from the curved surfaces in which the collapsing torque to the collapsed region is generally constant, it is possible to carry out stably the collapsing operation with a less energy and to accomplish more effectively a low current consumption when collapsing.

Further, the lens barrel may be applied to a zoom lens and a so-called variable focal lens in which a plurality of variable power ratios or focal lengths can be selected as desired. Especially, in case of the zoom lens, an amount of renormalization of the lens groups becomes relatively large in the photographing and collapsed states, on the other hand, a low current consumption of the lens barrel in the zoom lens, when collapsing, can be carried out effectively by the lens barrel including the plurality of the lens groups, each having an independent moving locus operated by the cam.

It is, also, possible to eliminate a power consumption of a camera and further to extend a battery life in case of a battery power source, if the aforementioned lens barrel is used to the camera. It is, further, possible to minimize a power consumption of a digital camera in which the power consumption tends to become large, and to extend a battery life in the digital camera, if the lens barrel is used to the digital camera, because the power consumption can be restricted when collapsing, as described above.

What is claimed is:

1. A lens barrel comprising:
   a plurality of lens groups;
   a cam cylinder comprising a cam configured to move a portion of said plurality of lens groups toward positions corresponding to a predetermined photographing state and a predetermined collapsed state along an optical axis;
   a cam follower configured to move said portion of the plurality of lens groups by engaging with said cam and rotating relatively to said cam cylinder along said cam; and
   an elastomer for biasing said cam follower along said optical axis to slide the cam follower on said cam, a biased force of said elastomer varying in response to a moved position of said cam follower;

wherein a developed shape of said cam has different angles to a plane depending on a position in a collapsible region in which said cam follower is moved from a photographing state to a collapsed state, the developed share of the cam is configured to suppress an increase in a rotational torque during movement of the cam follower between the photographing and collapsed states, and the portion of the plurality of lens groups comprises a lens group configured to be biased by the elastomer in a direction opposite to a collapsing direction.

2. The lens barrel according to claim 1, wherein said cam includes a sliding surface for engaging with said cam follower and said sliding surface in the developed shape of the cam is formed from a configuration in which a plurality of surfaces having different angles to the imaged plane are connected successively.

3. The lens barrel according to claim 1, wherein said cam includes a sliding surface for engaging with said cam follower and said sliding surface in the developed shape of the cam is formed from a curved surface varying continuously at different angles to the imaged plane.

4. The lens barrel according to claim 1, wherein said elastomer includes a spring.

5. The lens barrel according to claim 1, wherein said elastomer is disposed between at least two lens groups of said plurality of lens groups.

6. The lens barrel according to claim 1, wherein said plurality of lens groups have first and second group lens systems, said cam includes first and second cam grooves each having sliding surfaces, said cam follower includes a first cam follower engaging with said first cam groove and a second cam follower engaging with said second cam groove, and wherein said lens barrel comprises a fixing cylinder having first and second guide grooves in which the first and second cam followers are engaged and which extend straightly along an optical axis and holding rotatably the cam cylinder, a first moving cylinder disposed in said fixing cylinder to move along the optical axis for holding said first cam follower and first group lens system, and a second moving cylinder disposed in said fixing cylinder to move along the optical axis for holding said second cam follower and second group lens system, said elastomer is disposed between the first and second moving cylinders to bias them in opposite directions, and said first and second moving cylinders are moved along the optical axis by rotating relatively said cam cylinder relative to said fixing cylinder.

7. The lens barrel according to claim 6, wherein each of said sliding surfaces has a configuration in which a plurality of surfaces having different angles to an imaged plane depending on a position in the collapsed region are connected successively.

8. The lens barrel according to claim 6, wherein each of said sliding surfaces is formed from a curved surface in which angles to a plane are varied continuously depending on a position in the collapsed region.

9. A lens barrel comprising:

a plurality of lens groups;

a cam cylinder comprising a cam configured to move at least a portion of the plurality of lens groups toward positions corresponding to a predetermined photographing state and a predetermined collapsed state along an optical axis;

a cam follower configured to move the portion of lens groups by engaging with the cam and rotating relatively to the cam cylinder along the cam; and an elastomer for biasing the cam follower along the optical axis to slide the cam follower on the cam, a biased force of the elastomer varying in response to a moved position of the cam follower;

wherein a developed shave of the cam has different angles to a plane depending on a position in a collapsible region in which the cam follower is moved from a photographing state to a collapsed state, wherein the cam includes a sliding surface for engaging with the cam follower and the sliding surface in the developed share of the cam is formed from a curved surface varying continuously at different angles to the imaged plane, and wherein each of said sliding surfaces is formed from a curved-shaped surface in which a torque is substantially constant at the time of collapsing to the collapsed region.

10. The lens barrel according to claim 1, wherein said plurality of lens groups include a zoom lens.

11. A camera comprising:

a lens barrel;

said lens barrel comprising:

a plurality of lens groups;

a cam cylinder comprising a cam configured to move a portion of said plurality of lens groups toward in a position corresponding to a predetermined photographing state and a collapsed state along an optical axis;

a cam follower configured to move said portion of the plurality of lens groups by engaging with said cam and rotating relatively to said cam cylinder along said cam; and a resilient body for biasing said cam follower along said optical axis to slide the cam follower on said cam, a biased force of said resilient body varying in response to a moved position of said cam follower;

wherein a developed shape of said cam has different angles to a plane depending on a position in a collapsed region in which said cam follower is moved from a photographing state to a collapsed state, the developed shape of the cam is configured to suppress an increase in a rotational torque during movement of the cam follower between the photographing and collapsed states, and the portion of the plurality of lens groups comprises a lens group configured to be biased by the resilient body in a direction opposite to a collapsing direction.

12. The camera according to claim 11, wherein said camera is a digital camera.

* * * * *